United States Patent [19]

Roegner et al.

[11] 4,250,537

[45] Feb. 10, 1981

[54] DISCOTHEQUE SIMULATING HOME ENTERTAINMENT SYSTEM

[75] Inventors: George P. Roegner, Far Hills, N.J.; Richard Hawley, Santa Claus, Ind.; Howard Steen, Santa Claus, Ind.; Sig Biener, Santa Claus, Ind.

[73] Assignee: Soundesign Corporation, Jersey City, N.J.

[21] Appl. No.: 40,150

[22] Filed: May 17, 1979

[51] Int. Cl.[3] ........................ F21V 7/04; F21V 33/00; G11B 1/04

[52] U.S. Cl. ........................................ 362/86; 362/87; 362/253; 362/297; 362/343; 362/346; 362/348; 362/811; 362/133; 40/431; 40/455; 369/5; 369/12

[58] Field of Search .................. 40/431, 433, 455–457; 362/811, 35, 86–87, 133, 253, 806, 297, 343, 346–348, 350, 297; D14/15, 18, 22–23; D21/64, 112; 274/10 D, 2; 84/464; 353/15–16; 358/250, 254

[56] References Cited

U.S. PATENT DOCUMENTS

| | | | |
|---|---|---|---|
| 1,214,863 | 2/1917 | Woeste | 362/346 |
| 1,270,268 | 6/1918 | Crownfield | 362/297 |
| 1,393,919 | 10/1921 | Stone | 362/133 |
| 1,487,156 | 3/1924 | Foley | 362/133 |
| 1,541,687 | 6/1925 | Cory | 40/431 |
| 1,747,556 | 2/1930 | Price | 40/431 |
| 1,805,244 | 5/1931 | Oestnaes | 362/346 |
| 1,915,842 | 6/1933 | Winkler | 362/348 |
| 1,950,130 | 3/1934 | Barlow | 362/347 |
| 2,022,639 | 11/1935 | Stimson | 362/346 |
| 2,102,975 | 12/1937 | Rolph | 362/297 |
| 2,383,042 | 8/1945 | Cavert | 362/348 |
| 2,677,297 | 5/1954 | Wetzel | 84/464 |
| 3,215,022 | 11/1965 | Orgo | 84/464 |
| 3,300,266 | 1/1967 | Browning | 362/346 |
| 3,538,323 | 11/1970 | Ziegler | 362/806 |
| 3,603,195 | 9/1971 | Williams | 84/464 |
| 3,679,888 | 7/1972 | Reiback | 40/431 |
| 4,171,882 | 10/1979 | Johnson | 84/464 R |

FOREIGN PATENT DOCUMENTS

| | | | |
|---|---|---|---|
| 560153 | 3/1944 | United Kingdom | 358/250 |

OTHER PUBLICATIONS

*Radio Electronics*, Cartoon, Aug. 1950.

*Primary Examiner*—Stephen C. Bentley
*Assistant Examiner*—Edward F. Miles
*Attorney, Agent, or Firm*—Kirschstein, Kirschstein, Ottinger & Cobrin

[57] ABSTRACT

A home entertainment system and lighting cabinet simulates the sound and lighting effects of a discotheque. Light rays from a bank of differently colored lights are directed both to a mirrored rotating globe and to a rear reflecting panel behind the globe. A plurality of reflecting part-spherical domes and pyramidal-like projections are arranged on the rear panel and are configurated to reflect at least some of the impinging light rays back to the globe for subsequent reflection therefrom. The light rays reflected off the globe, domes and projections are projected about the room in which the system is located in a very dense pattern of reflected differently colored images. A stereo music system is mounted on the cabinet to combine a discotheque sound effect with the above-described lighting effect.

22 Claims, 3 Drawing Figures

DISCOTHEQUE SIMULATING HOME ENTERTAINMENT SYSTEM

BACKGROUND OF THE INVENTION

1. Field of the Invention

The invention generally relates to home entertainment systems and, more particularly, to sound and lighting systems which simulate the environment of a discotheque or ballroom.

2. Description of the Prior Art

It is known in the decorative lighting art to reflect light rays off rotating mirrored surfaces to thereby project reflected light image patterns which move across the surrounding walls of a room. U.S. Pat. Nos. 1,541,687; 1,747,556; 2,677,297; 3,215,022; 3,538,323; 3,603,195; and 3,679,888 are representative of such art.

However, all of the known decorative lighting systems are permanently installed in theatres, ballrooms and discotheques. To date, none of these lighting systems have been incorporated into a portable home entertainment system. Moreover, the known decorative lighting systems which used mirrored ball-like chandeliers have not proven to be altogether satisfactory in projecting a very dense pattern of reflected light images. To achieve dense lighting patterns, the prior art has resorted to using more than one mirrored ball, vary large mirrored balls, and a multitude of spotlights. All of these approaches are not satisfactory in the home environment where space for a large ball, or for more than one ball, or for a multitude of spotlights is limited, and where the cost for such a complex construction is a relevant consideration.

SUMMARY OF THE INVENTION

1. Objects of the Invention

Accordingly, it is the general object of this invention to overcome the aforementioned drawbacks of the prior art.

Another object of this invention is to simulate the sound and lighting effects of a discotheque with an entertainment system which is portable, compact and particularly well adapted for home use.

Still another object of this invention is to create on the walls, ceiling and floor of a room a very dense lighting pattern of reflected images which is highly aesthetic, appealing and conducive to dancing.

An object of this invention is to combine a dazzling lighting effect with a sound system for creating a total simulated discotheque environment.

Another object of this invention is to provide an inexpensive home entertainment system and lighting cabinet which is simple to manufacture, compact in assembly, and attractive in appearance.

2. Features of the Invention

In keeping with these objects, and others which will become apparent hereinafter, one feature of the invention resides, briefly stated, in a sound system and lighting cabinet which simulates the sound and lighting effects of a discotheque. This entertainment system comprises an upright support having a front portion, a rear portion, a base portion mounted on a room floor, a roof portion elevated above the base portion, and an intermediate portion located between the base and roof portions. The entertainment system also comprises sound-generating means mounted on the intermediate portion and operative for transmitting sound, a mirrored generally ball-shaped globe mounted on the support for rotation about a vertical axis, which globe has a plurality of reflecting mirrors mounted on substantially its entire outer surface. The invention also comprises means for supporting the mirrored globe below the roof portion and above the sound-generating means.

The present invention further comprises light-generating means mounted on the roof portion at a location forwardly and upwardly of the mirrored globe which is operative for transmitting light rays in a direction generally rearwardly and downwardly towards the rear portion. The light-generating means includes first light rays which impinge upon and are thereupon reflected from the mirrored globe to project reflected images in a scattered pattern on the surrounding surfaces of the room in which the entertainment system is located, and second light rays which do not impinge directly on the globe, but are directed past the globe.

In addition, light-reflecting means are mounted on the rear portion of the cabinet. These light-reflecting means increase the number of scattered reflected images on the room surfaces to provide a denser lighting pattern and include a generally vertically-extending reflecting panel having an array of generally cup-shaped reflecting domes thereon mounted rearwardly of the globe and located in the paths of some of the first and second rays, said domes being configurated such that some of the first rays are reflected from the domes in a direction generally away from the globe, and such that some of the second rays are reflected back towards the globe.

The present invention further includes means for rotating the mirrored globe such that both the first light rays and the second light rays are scanned across the room surfaces and project thereon a moving light pattern.

In accordance with the present invention, the reflecting domes behind the mirrored globe are operative for reflecting not only the light rays which initially reflect off the globe and impinge on the domes, but also the light rays which initially do not impinge on the globe. Even more importantly, the reflecting domes reflect at least some of the rays which initially miss the globe and impinge on the domes back towards the globe. These latter rays now reflect off the globe for the first time either outwardly towards the room or rearwardly back towards the domes, whereupon another reflection takes place. This interplay of light between the mirrored globe and the reflecting domes creates a highly dazzling and very dense light pattern on the room walls, floor and ceiling. The lighting effect of a discotheque is thereby effectively simulated in the home.

The lighting cabinet or upright support not only supports the mirrored globe, reflecting panel and the lights, but also supports a sound-generating apparatus; for example, a tape record and/or reproducing unit, a cassette or cartridge player, a tuner, a radio receiver, a phonograph, or any other analogous sound-producing unit. Either separate units or one unit combined as an integrated assembly may be supported on the cabinet. Preferably, the sound-producing is capable of generating very loud amplified music which is conducive to creating the overall discotheque environment. The lighting cabinet, with all of the above-described components mounted thereon, is light in weight and can be transported easily from place to place.

In accordance with another feature of the invention, a plurality of generally pyramidal-shaped light reflecting projections are formed in the reflecting panels in a side-by-side relationship with the reflecting part-spherical domes. These pyramidal projections cooperate with the domes to reflect light rays back to the globe to further enhance the overall lighting effect.

In accordance with yet another feature of the invention, the mirrored globe is suspended by a swingable member, such as a string or an interconnected chain of links, or a hook so as to permit swinging movement in a radial direction. In the event that a user pushes the globe or, in the event that wind currents are present in the room or if there are vibrations induced by the music or dancing, the globe will rock back and forth, thereby creating a highly unusual lighting effect, i.e. the reflected light images on the room surfaces will either increase or decrease in size depending on the rocking movement. In addition, the various light images will similarly travel in a random movement, quite apart from the movement imparted solely by the motor drive for the globe.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 3:
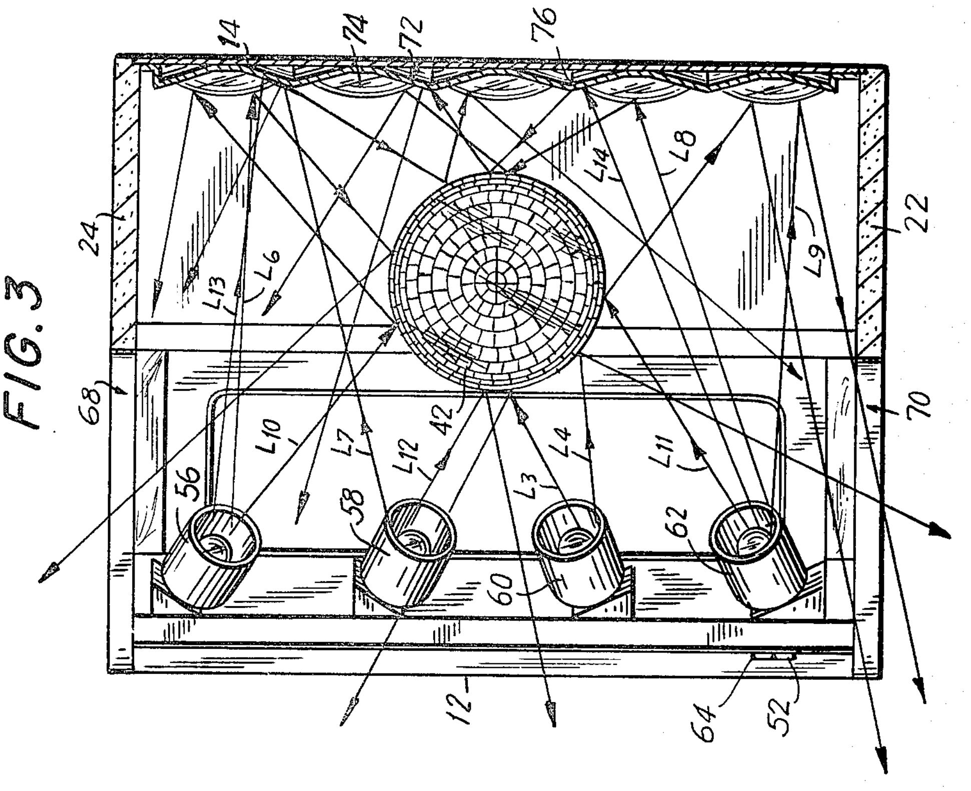
FIG. 3 is a plan sectional view as taken along line 3—3 of FIG. 2.

The entertainment system and lighting cabinet is generally designated by reference numeral 10 in the drawings. The cabinet or upright support 10 includes a front frame portion 12, a rear frame portion 14, a base frame portion 16 adapted to support the cabinet on a room floor, a roof portion 18 elevated above the base, a platform portion 20 juxtaposed between the base and roof portions, and a pair of side wall portions 22, 24 located at opposite lateral sides of the cabinet and extending from the base 16 up to the roof 18. All of the above-described cabinet portions are assembled together to form a unit and are made of sturdy lightweight materials such as wood or flakeboard and may have aluminum trim for aesthetic and reinforcement reasons.

A sound-generating means is mounted on platform 20. A volume control knob 28 is operative for turning the sound volume of the sound-generating device 26 to a high loudness level, as is commonly found in discotheques, ballrooms or analogous dance halls. The sound-generating device can be a tape recording and/or reproducing unit, cassette or cartridge player, a tuner, a radio receiver, a phonograph, or any other analogous sound-producing unit. Either separate units or one unit combined as an integrated assembly may be supported on the cabinet. A stereophonic integrated console comprising a tape cartridge player with cartridge storage means, a phonograph and an AM-FM receiver is illustrated in the preferred embodiment.

The cabinet 10 also includes an inclined frame portion 30 which is inclined rearwardly from the front 12 towards but terminating short of the rear 14. Sound holes 34, 36 are formed in the inclined portion 30, and woofer 38 and tweeter 40 are respectively mounted at these holes. A fabric or polyurethane foam cover 32 covers the inclined portion and protects the loudspeakers 38, 40. The electrical connections between the loudspeakers and the sound-generating device 26 is entirely conventional and has been omitted for the sake of clarity.

A mirrored generally ball-shaped globe 42 is mounted on the support for rotation about a generally vertical axis. An electric drive motor 44 capable of running at a uniform, relatively low speed on the order of 6 r.p.m. is mounted in a separate compartment in the roof 18. The globe is operatively connected to the motor drive shaft 45 by means of an elongated swingable member 50, whose opposite hook-shaped ends are respectively pivotally attached to hooks 46, 48 which are respectively mounted on the shaft 45 and the globe 42. The swingable member 50 supports the globe below the roof 18, but above the sound-generating device 26. The swingable member may be a flexible string, or a series of interconnected chain links, or preferably, an S-shaped hook, or any other analogous type of swingable support which is capable of supportably swinging the globe in the event that the latter is pushed in radial direction, either by wind currents or manually, or by vibrations induced by the music and/or dancing. A globe-actuating means or switch 52 is mounted at the front of the roof 18 and is operative for initiating and for terminating the rotation of the globe about its vertical axis. The electrical connection between the switch 52 and the motor drive 44 is entirely conventional and has been omitted for the sake of clarity.

Substantially the entire outer surface of the globe is covered by a plurality of light-reflective mirrors or surfaces which are permanently attached thereto. The individual surfaces or mirrors are quadrilaterally-shaped and are arranged in circumferentially-extending rows which are stacked one above another in a vertical direction.

Light-generating means 54 including a plurality of lamps 56, 58, 60, 62 are mounted on the roof 18 at a location forwardly and upwardly of the mirrored globe 42. The lamps are mounted on inclined pedestals and are operative for transmitting light rays in a direction generally rearwardly and downwardly towards the rear portion 14. A light-actuating means or switch 64 is mounted separately at the front of the roof 18 and is operative for initiating and for terminating the transmission of the light rays. The electrical connection between the switch 64 and the individual lamps is entirely conventional and has been omitted for the sake of clarity. The light switch 64 is operated completely independently of the globe-actuating means 52.

Each one of the lamps has a parabolic reflector, e.g. 65, therein which is plated with a differently colored metallic layer, e.g. green, red, blue and yellow. Thus, the light beams emitted from the various lamps will be of different colors.

Referring again to the cabinet construction, a quadrilaterally-shaped roof aperture 66 is formed at the top of the roof 18 in the region upwardly and forwardly of the globe. Also, the side walls 22, 24 are formed with cutouts 70, 68. Each cutout extends from the front 12 in rearward direction but terminates short of the rear 14 at a point which is slightly past the most forward region of the globe 42.

Figure 1:
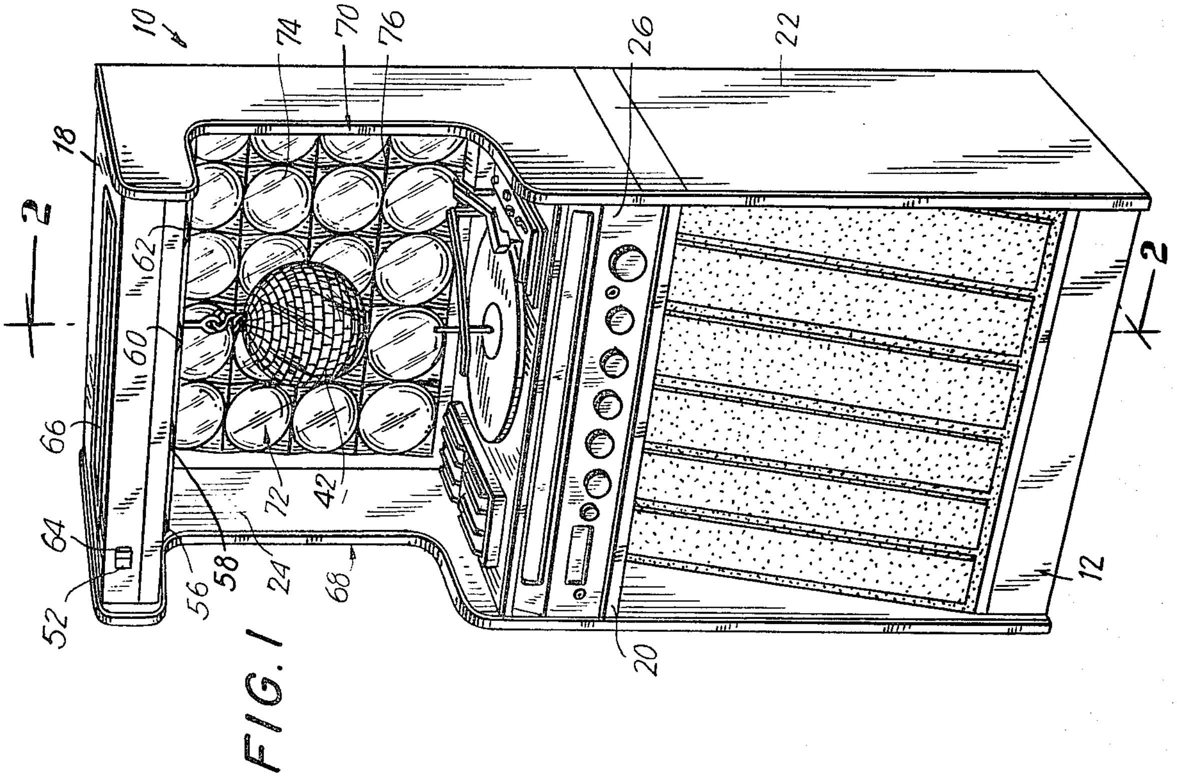
FIG. 1 is a front perspective view of the entertainment system and lighting cabinet in accordance with the present invention.

Light-reflecting means or a generally vertically-extending reflective panel 72 is mounted on the rear portion 14. The rear panel 72 has an array of generally cup-shaped light reflecting domes, e.g. 74, each dome being of part-spherical configuration. The forwardly bulging domes are preferably arranged in horizontally-extending rows and are stacked in vertically-extending columns. In the preferred embodiment illustrated, five domes are contained in each row and four are contained in each column. The domes have circular bases and are arranged in contiguous relationship with each other such that the circular bases of each two adjoining domes touch each other only at their common points of tangency. The reflecting panel 72 also has formed therein an array of generally pyramidal-shaped auxiliary light-reflecting projections, e.g. 76. Each outwardly bulging pyramidal projection has a forwardly projecting apex and a quadrilateral base which is bounded by the reflecting domes. As best shown in FIG. 1, each projection 76 is located between each two adjacent domes in one row and between the next two adjacent domes in the next row. The sides of the base of each pyramidal projection 76 are curved inwardly, thus giving the base a diamond-like appearance.

Both the pyramidal projections 76 and the part-spherical domes 74 are formed of one-piece with the panel 72 and constitute the entire surface area thereof. The panel 72 is preferably formed of a vacuum formed polystyrene plastic material which is vacuum metallized over its outer surfaces with a metallic layer having a specular finish such as aluminum. Of course, other materials having a light-reflective outer surface can be used.

Figure 2:
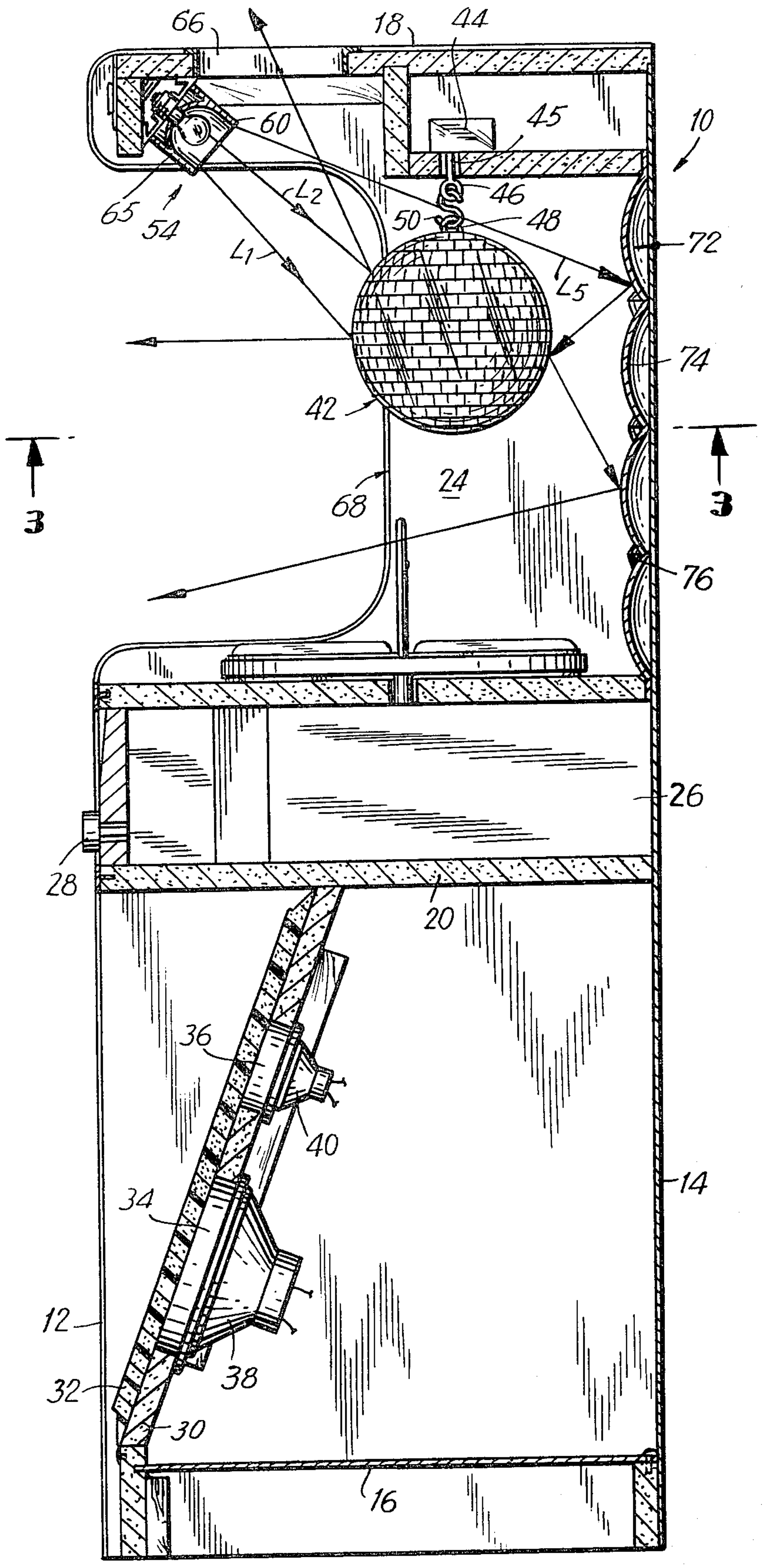
FIG. 2 is a side sectional view as taken along line 2—2 of FIG. 1.

As best shown in FIG. 2, first ones of the light rays, L1, L2, from representative lamp 60 directly impinge on the globe 42 and are thereupon reflected therefrom. Ray L2 is reflected through the roof aperture 66. Ray L1 is reflected forwardly into the room or can be reflected sideways through either side cutout 68, 70.

Compare rays L3, L4, L12 in FIG. 3 for forward and sideways reflections by light rays for representative lamps 60, 58. Thus, the lamp 60, as well as all of the other lamps, cooperate with the globe to project differently colored reflected light images in a scattered pattern on the surrounding walls, ceiling and floor of a room in which the cabinet is situated. The reflected light images may be sharply focused, i.e. definitely shaped, or may be partly aberrated or fuzzy images in the form of round spots simulating toy balloons. When the globe is rotated about its vertical axis, the light spots are moved across the room surfaces.

Second ones of the light rays, e.g. L5, L6, L7, L8, L9, L13, L14 are directed past the globe without impinging directly thereon. These second rays impinge directly on the panel 72 and specifically on either the domes 72 or the pyramidal projections 76. Thereupon, these rays are reflected in forward direction. Certain of the second rays, e.g. L7, L9 in FIG. 3 are reflected from the panel 72 forwardly without ever impinging on the globe 42. For example, L7 first impinges on a pyramidal projection, and thereupon is reflected out through side cutout 68 of the cabinet. Ray L9 first impinges on a dome and thereupon is reflected out through side cutout 70 of the cabinet. However, due to the outwardly bulging shapes of the convex domes and pyramidal projections, most of these second rays are focused back towards the globe for direct impingement thereon. For example, ray L6 first impinges on a dome, then is focused back to the globe, and thereupon is reflected out through side cutout 68. Ray L14 first impinges on a pyramical projection, then is focused back to the globe, and thereupon is reflected back towards the panel towards another pyramidal projection, whereupon it is reflected forwardly out through the front of the cabinet. Ray L8 first impinges on a dome, then is focused back to the globe and thereupon is reflected back towards the panel towards another dome, and thereupon is reflected out through the side cutout 68 of the cabinet. Ray L5 first impinges on a dome, then is focused back to the globe, and thereupon is reflected back towards the rear panel 72 for impingement on another dome, and thereupon is reflected out through the front of the cabinet towards the floor. Ray L13 first impinges on a pyramidal projection, then is focused back to the globe, and thereupon is reflected back towards the rear panel 72 for impingement on a dome, and thereupon is reflected out through the side cutout 70 of the cabinet.

In use: certain of the first light rays impinge on the globe directly from the lamps, and thereupon are reflected away from the rear panel 72, e.g. L1, L2, L3, L4, L12; others of the first rays impinge on the globe directly from the lamps, and thereupon are reflected towards the rear panel 72 for subsequent reflection therefrom, e.g. L10, L11; certain of the second light rays impinge on the rear panel and thereupon are reflected away from the globe, e.g. L7 L9; others of the second light rays impinge on the rear panel, and thereupon are reflected back towards the globe, and thereupon are reflected away from the rear panel, e.g. L6; still others of the second light rays impinge on the rear panel, and thereupon are reflected back towards the globe, and thereupon are reflected back towards the rear panel, e.g. L5, L8, L13, L14.

The above-described interplay of light reflections between the reflecting panel 72 and the globe causes the number of scattered reflected differently colored light spots on the room surfaces to be much more dense, i.e. more cluttered or concentrated, thereby making the resulting pattern more aesthetic as compared to prior art constructions.

When the globe is turned, all of the above-mentioned light beams reflected off the outwardly bulging domes and pyramidal projections, as well as off the globe, are scanned across the room and project a moving light pattern which seemingly dances over the room surfaces. The sound-producing unit, together with the above-described novel light pattern, is highly effective in establishing a simulated discotheque environment in the home.

At the same time, it will be remembered that the globe is suspended from the roof by a swingable element which permits rocking movement of the globe in response to manual pushing and/or air currents and/or vibrations caused by the amplified music and/or vibrations caused by dancing in the room and/or from any other disturbance. Hence, this additional rocking pendulum movement will cause the various light spots to appear to grow or shrink in size, depending on the direction of the pendulum movement relative to the reflecting panel. Of course, this swinging causes an additional component of motion, quite apart from the motion caused solely by the motor drive. A highly novel, unique and dazzling light effect is thereby created which is highly conducive to dancing.

All of the surfaces of the domes and the pyramidal projections which face the mirrored globe have the reflected image of the latter viewable thereon. This creates the illusion that many such mirrored balls are present in the room and enhances the overall discotheque environment.

If desired, the mirrored ball can be detached from the swingable element 50 in the event that a user wishes to use the entertainment system in a more subdued environment, i.e. without so many light spots being projected on the room surfaces. In this case, the reflecting panel is the only element which reflects the lamp light rays. In this latter case, one would not want to have the motor drive operated. This is why the switches 52 and 64 are separately actuatable.

It will be understood that each of the elements described above, or two or more together, may also find a useful application in other types of constructions differing from the types described above.

While the invention has been illustrated and described as embodied in a discotheque simulating home entertainment system, it is not intended to be limited to the details shown, since various modifications and structural changes may be made without departing in any way from the spirit of the present invention.

In a preferred embodiment, a metallic coating with a specular finish such as aluminum is deposited substantially over the entire outer surface of the injection molded globe, preferably by vacuum metallized or by spray metallizing techniques. The shapes are preferably formed as quadrilaterals to simulate the appearance of individual mirrors mounted on the globe.

Without further analysis, the foregoing will also fully reveal the gist of the present invention that others can, by applying current knowledge, readily adapt it for various applications without omitting features that, from the standpoint of prior art, fairly constitute essential characteristics of the generic or specific aspects of the invention and, therefore, such adaptations should and are intended to be comprehended within the meaning and range of equivalence of the following claims.

What is claimed as new and desired to be protected by Letters Patent is set forth in the appended claims:

1. An entertainment system for simulating the sound and lighting effects of a discotheque in a room in which the entertainment system is located, comprising:

(a) an upright support for supporting the entertainment system on the floor of the room;

(b) sound-generating means mounted on the support and operative for transmitting amplified sounds;

(c) a mirrored generally ball-shaped globe mounted on the support for rotation about a vertical axis, said mirrored globe having a plurality of reflecting surfaces located on its outer surface;

(d) light-generating means mounted on the support at a location remote from the mirrored globe, and operative for transmitting light rays, some of which impinge on and reflect off the mirrored globe to thereby project reflected images in a scattered pattern on the surrounding surfaces of the room in which the system is located;

(e) means for rotating the mirrored globe such that the projected reflected images are scanned across the surrounding room surfaces to thereby project thereon a moving light pattern which together with the amplified sounds transmitted by the sound-generating means simulate the amplified sound and moving light environment of a discotheque;

(f) additional light-reflecting means mounted on the support for increasing the number of scattered reflected images on the room surfaces to thereby provide a denser lighting pattern, including a reflecting panel mounted on the support and having a rear reflecting portion which is located rearwardly of the globe and which extends in a direction generally parallel to said vertical axis;

(g) said additional light-generating means being mounted on the support at a location forwardly of the mirrored globe such that first ones of the light rays are transmitted rearwardly towards the globe for direct impingement thereon and thereupon for reflection therefrom, and such that second ones of the light rays are transmitted rearwardly past the mirrored globe without impinging directly thereon;

(h) said rear reflecting portion being located in the paths of some of said first and second rays such that some of said first rays are reflected from said rear reflecting portion in a direction generally away from the globe, and such that some of said second rays are reflected back towards the globe for direct impingement thereon and for subsequent reflection therefrom;

(i) said rear reflecting portion having an array of generally cup-shaped reflecting domes thereon which are so configurated such that said some second light rays are focused back towards the globe for direct impingement thereon and for subsequent reflection therefrom, whereby said some second light rays which impinge the turning globe directly from the reflecting domes as well as the first light rays which impinge the turning globe directly from the light-generating means are all scanned across the room surfaces to thereby project thereon a moving light pattern; and (j) said domes being arranged in horizontally-extending rows and vertically-extending columns, each dome having a part-spherical configuration.

2. The entertainment system of claim 1, wherein five domes are contained in each row, and four domes are contained in each column.

3. The entertainment system of claim 1, wherein said upright support includes a front portion, a rear portion, a base portion for engaging the room floor, a roof portion elevated above the base portion, and an intermediate portion located between the base and the roof portions.

4. The entertainment system of claim 3, wherein said intermediate portion of the support includes a generally horizontal platform elevated above the base portion, and an inclined platform extending from the front portion in rearward direction towards the rear portion; said sound-generating means being mounted on the horizontal platform; and further comprising loudspeaker means mounted on the inclined platform.

5. The entertainment system of claim 3, and further comprising wall means on the roof portion for defining a roof aperture through which the light rays, which are reflected generally upwardly from the globe, pass to thereby project reflected images on the ceiling and upper portions of the room wall surfaces.

6. The entertainment system of claim 3, wherein said globe is mounted below the roof portion and above the sound-generating means which is mounted on the intermediate portion of the support.

7. The entertainment system of claim 3, wherein said light-generating means is mounted on the roof portion at a location forwardly and upwardly of the mirrored globe, and is operative for transmitting light rays in a direction generally rearwardly and downwardly towards the rear portion.

8. The entertainment system of claim 1, wherein said reflecting surfaces on the mirrored globe cover substantially the entire outer surface of the globe.

9. An entertainment system for simulating the sound and lighting effects of a discotheque in a room in which the entertainment system is located, comprising:

(a) an upright support for supporting the entertainment system on the floor of the room;

(b) sound-generating means mounted on the support and operative for transmitting amplified sounds;

(c) a mirrored generally ball-shaped globe mounted on the support for rotation about a vertical axis, said mirrored globe having a plurality of reflecting surfaces located on its outer surface;

(d) light-generating means mounted on the support at a location remote from the mirrored globe, and operative for transmitting light rays, some of which impinge on and reflect off the mirrored globe to thereby project reflected images in a scattered pattern on the surrounding surfaces of the room in which the system is located;

(e) means for rotating the mirrored globe such that the projected reflected images are scanned across the surrounding room surfaces to thereby project thereon a moving light pattern which together with the amplified sounds transmitted by the sound-generating means simulate the amplified sound and moving light environment of a discotheque;

(f) additional light-reflecting means mounted on the support for increasing the number of scattered reflected images on the room surfaces to thereby provide a denser lighting pattern, including a reflecting panel mounted on the support and having a rear reflecting portion which is located rearwardly of the globe and which extends in a direction generally parallel to said vertical axis;

(g) said additional light-generating means being mounted on the support at a location forwardly of the mirrored globe such that first ones of the light rays are transmitted rearwardly towards the globe for direct impingement thereon and thereupon for reflection therefrom, and such that second ones of the light rays are transmitted rearwardly past the mirrored globe without impinging directly thereon;

(h) said rear reflecting portion being located in the paths of some of said first and second rays such that some of said first rays are reflected from said rear reflecting portion in a direction generally away from the globe, and such that some of said second rays are reflected back towards the globe for direct impingement thereon and for subsequent reflection therefrom;

(i) said rear reflecting portion having an array of generally cup-shaped reflecting domes thereon which are so configurated such that said some second light rays are focused back towards the globe for direct impingement thereon and for subsequent reflection therefrom, whereby said some second light rays which impinge the turning globe directly from the reflecting domes as well as the first light rays which impinge the turning globe directly from the light-generating means are all scanned across the room surfaces to thereby project thereon a moving light pattern; and (j) said domes having generally circular bases and are arranged such that the circular bases of adjoining domes touch each other only at their common points of tangency.

10. An entertainment system for simulating the sound and lighting effects of a discotheque in a room in which the entertainment system is located, comprising:

(a) an upright support for supporting the entertainment system on the floor of the room;

(b) sound-generating means mounted on the support and operative for transmitting amplified sounds;

(c) a mirrored generally ball-shaped globe mounted on the support for rotation about a vertical axis, said mirrored globe having a plurality of reflecting surfaces located on its outer surface;

(d) light-generating means mounted on the support at a location remote from the mirrored globe and operative for transmitting light rays, some of which impinge on and reflect off the mirrored globe to thereby project reflected images in a scattered pattern on the surrounding surfaces of the room in which the system is located;

(e) means for rotating the mirrored globe such that the projected reflected images are scanned across the surrounding room surfaces to thereby project thereon a moving light pattern which together with the amplified sounds transmitted by the sound-generating means simulate the amplified sound and moving light environment of a discotheque;

(f) additional light-reflecting means mounted on the support for increasing the number of scattered reflected images on the room surfaces to thereby provide a denser lighting pattern, including a reflecting panel mounted on the support and having a rear reflecting portion which is located rearwardly of the globe and which extends in a direction generally parallel to said vertical axis;

(g) said additional light-generating means being mounted on the support at a location forwardly of the mirrored globe such that first ones of the light rays are transmitted rearwardly towards the globe for direct impingement thereon and thereupon for reflection therefrom, and such that second ones of the light rays are transmitted rearwardly past the mirrored globe without impinging directly thereon;

(h) said rear reflecting portion being located in the paths of some of said first and second rays such that some of said first rays are reflected from said rear reflecting portion in a direction generally away from the globe, and such that some of said second rays are reflected back towards the globe for direct impingement thereon and for subsequent reflection therefrom;

(i) said rear reflecting portion having an array of generally cup-shaped reflecting domes thereon which are so configurated such that said some second light rays are focused back towards the globe for direct impingement thereon and for subsequent reflection therefrom, whereby said some second light rays which impinge the turning globe directly from the reflecting domes as well as the first light rays which impinge the turning globe directly from the light-generating means are all scanned across the room surfaces to thereby project thereon a moving light pattern; and (j) auxiliary generally pyramidal-shaped light-reflecting projections on the rear reflecting portion, each auxiliary projection being bordered by the reflecting domes and cooperating with the latter to reflect light rays back to the globe.

11. The entertainment system of claim 10, wherein said domes are arranged in horizontally-extending rows stacked one above another, and wherein each auxiliary projection is located between each two adjacent domes in one row and the two adjacent domes in the next stacked row.

12. An entertainment system for simulating the sound and lighting effects of a discotheque in a room in which the entertainment system is located, comprising:

(a) an upright support for supporting the entertainment system on the floor of the room, said upright support including a front portion, a rear portion, a base portion for engaging the room floor, a roof portion elevated above the base portion, and an intermediate portion located between the base and the roof portions;

(b) sound-generating means mounted on the support and operative for transmitting amplified sounds;

(c) a mirrored generally ball-shaped globe mounted on the support for rotation about an axis, said mirrored globe having a plurality of reflecting surfaces located on its outer surface;

(d) light-generating means mounted on the support at a location remote from the mirrored globe, and operative for transmitting light rays, some of which impinge on and reflect off the mirrored globe to thereby project reflected images in a scattered pattern on the surrounding surfaces of the room in which the system is located;

(e) means for rotating the mirrored globe such that the projected reflected images are scanned across the surrounding room surfaces to thereby project thereon a moving light pattern which together with the amplified sounds transmitted by the sound-generating means simulate the amplified sound and moving light environment of a discotheque; and (f) said support further including upright side wall portions extending between the base and the roof portions at opposite sides of the support; and further comprising cutout wall means for defining a cutout on each of the side wall portions in the region below the roof portion but above the sound-generating means which is mounted on the intermediate portion of the support, each cutout extending from the front portion but terminating short of the rear portion of the support; and wherein each cutout bounds an opening through which the light rays, which are reflected generally laterally of the globe, pass to thereby project reflected images on the room side walls.

13. The entertainment system of claim 12, and further comprising means for supporting the mirrored globe on the support for swinging movement relative thereto, including a swingable member on which the globe is suspended from the support for pendulum-like swinging movement.

14. The entertainment system of claim 13, wherein said globe is detachably connected to the swingable member.

15. The entertainment system as defined in claim 12, and further comprising light-actuating means for initiating and for terminating the transmission of the light rays; and also comprising globe-actuating means for initiating and for terminating spinning of the globe.

16. The entertainment as defined in claim 15, wherein said light-actuating means and said globe-actuating means are independently operable and are separately mounted on the support.

17. The entertainment system of claim 12, wherein said light-generating means includes a plurality of lamps and means for modifying the color of the emitted light rays therefrom.

18. The entertainment system of claim 12, wherein said sound-generating means includes a radio receiver unit, a tape play/record unit, and a phonograph unit, each unit being operative for transmitting amplified sounds.

19. The entertainment system of claim 12, and further comprising additional light-reflecting means mounted on the support for increasing the number of scattered reflected images on the room surfaces to thereby provide a denser lighting pattern.

20. The entertainment system of claim 19, wherein said additional light-reflecting means includes a reflecting panel mounted on the support, wherein said globe is mounted on the support for rotation about a vertical axis, and wherein said reflecting panel has a rear reflecting portion which is located rearwardly of the globe and which extends in a direction generally parallel to said vertical axis.

21. The entertainment system of claim 20, wherein said additional light-generating means is mounted on the support at a location forwardly of the mirrored globe such that first ones of the light rays are transmitted rearwardly towards the globe for direct impingement thereon and thereupon for reflection therefrom, and such that second ones of the light rays are transmitted rearwardly past the mirrored globe without impinging directly thereon; and wherein said rear reflecting portion is located in the paths of some of said first and second rays such that some of said first rays are reflected from said rear reflecting portion in a direction generally away from the globe, and such that some of said second rays are reflected back towards the globe for direct impingement thereon and for subsequent reflection therefrom.

22. The entertainment system of claim 21, wherein said rear reflecting portion has an array of generally cup-shaped reflecting domes thereon which are so configurated such that said some second light rays are focused back towards the globe for direct impingement thereon and for subsequent reflection therefrom, whereby said some second light rays which impinge the turning globe directly from the reflecting domes as well as the first light rays which impinge the turning globe directly from the light-generating means are all scanned across the room surfaces to thereby project thereon a moving light pattern.

* * * * *